(12) United States Patent
Sarasmo et al.

(10) Patent No.: US 9,429,818 B2
(45) Date of Patent: Aug. 30, 2016

(54) ACCESSORY IDENTIFICATION AND CONFIGURATION AND CORRESPONDING ACCESSORY

(71) Applicant: HERE Global B.V, Veldhoven (NL)

(72) Inventors: Marko A. Sarasmo, Haukipudas (FI); Andrew Gartrell, Woodland Hills, CA (US); Tom Arbisi, Camarillo, CA (US); Vidyut Samanta, Santa Monica, CA (US); John-Rhys Newman, Woodland Hills, CA (US); Jeremy Matters, Valley Village, CA (US); Simon James, Simi Valley, CA (US); Julian Bleecker, Venice, CA (US)

(73) Assignee: HERE GLOBAL B.V., Eindhoven (NL)

( * ) Notice: Subject to any disclaimer, the term of this patent is extended or adjusted under 35 U.S.C. 154(b) by 223 days.

(21) Appl. No.: 14/245,454

(22) Filed: Apr. 4, 2014

(65) Prior Publication Data
US 2015/0286114 A1    Oct. 8, 2015

(51) Int. Cl.
*G03B 17/14* (2006.01)
*H04N 5/225* (2006.01)

(52) U.S. Cl.
CPC ............ *G03B 17/14* (2013.01); *H04N 5/2254* (2013.01)

(58) Field of Classification Search
CPC ................................ G03B 17/14; G02B 17/14
See application file for complete search history.

(56) References Cited

U.S. PATENT DOCUMENTS

| | | | | |
|---|---|---|---|---|
| 4,236,803 A | * | 12/1980 | Shimomura | G03B 17/20 396/298 |
| 4,439,029 A | | 3/1984 | Okura et al. | 354/479 |
| 6,269,222 B1 | | 7/2001 | Hartung | 396/301 |
| 7,848,634 B2 | | 12/2010 | Kranz et al. | 396/310 |
| 2004/0227845 A1 | | 11/2004 | Kawai | 348/360 |
| 2007/0099592 A1 | | 5/2007 | Thome et al. | 455/348 |
| 2007/0166028 A1 | | 7/2007 | Kranz et al. | 396/529 |
| 2008/0304818 A1 | | 12/2008 | Kranz et al. | 396/310 |

FOREIGN PATENT DOCUMENTS

DE          3438322 A1    4/1986

\* cited by examiner

*Primary Examiner* — Nelson D. Hernández Hernández
(74) *Attorney, Agent, or Firm* — Alston & Bird LLP

(57) ABSTRACT

An accessory includes a body including a dial having a surface and multiple sets of optically-recognizable identification marks formed as part of the surface. The identification marks for each set are formed to be recognizable by a sensor having a two dimensional array of pixels. An apparatus includes a body comprising a groove having a first surface configured to align with a second surface of an accessory when a portion of the accessory is placed into the groove and a sensor formed in the first surface. The sensor includes a two dimensional array of pixels. An apparatus captures, with the sensor, an image of one of a set of multiple optically-recognizable identification marks formed as part of a surface of the dial, determines from the captured image a specific one of multiple possible accessories interchangeable for use with the apparatus, and performs configuration operation(s) based on the specific accessory.

18 Claims, 15 Drawing Sheets

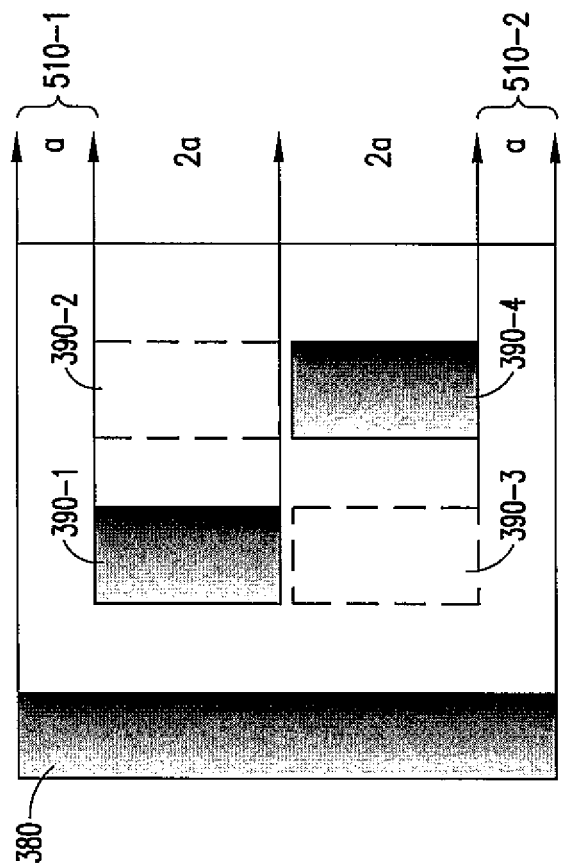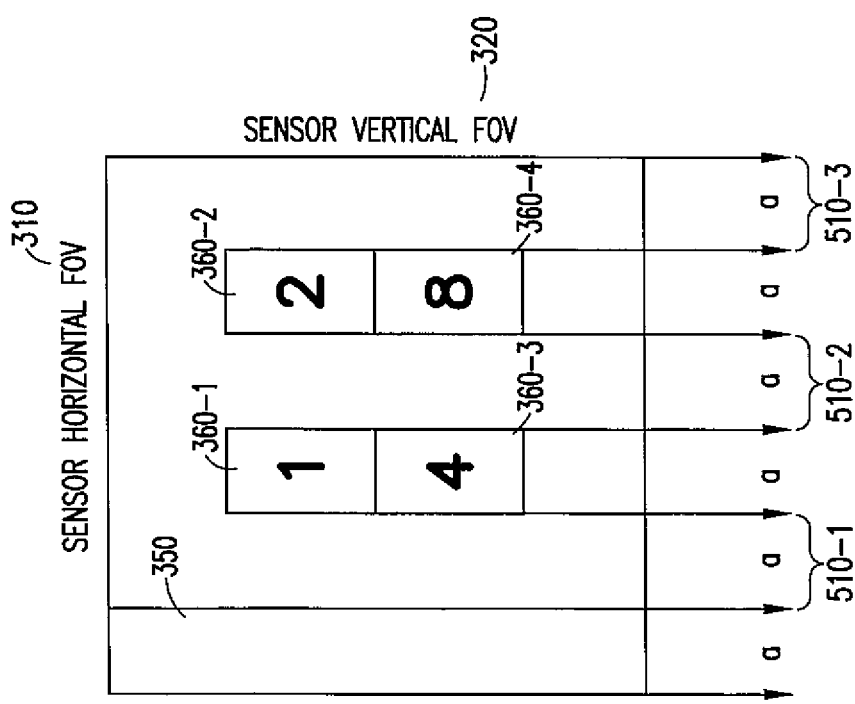

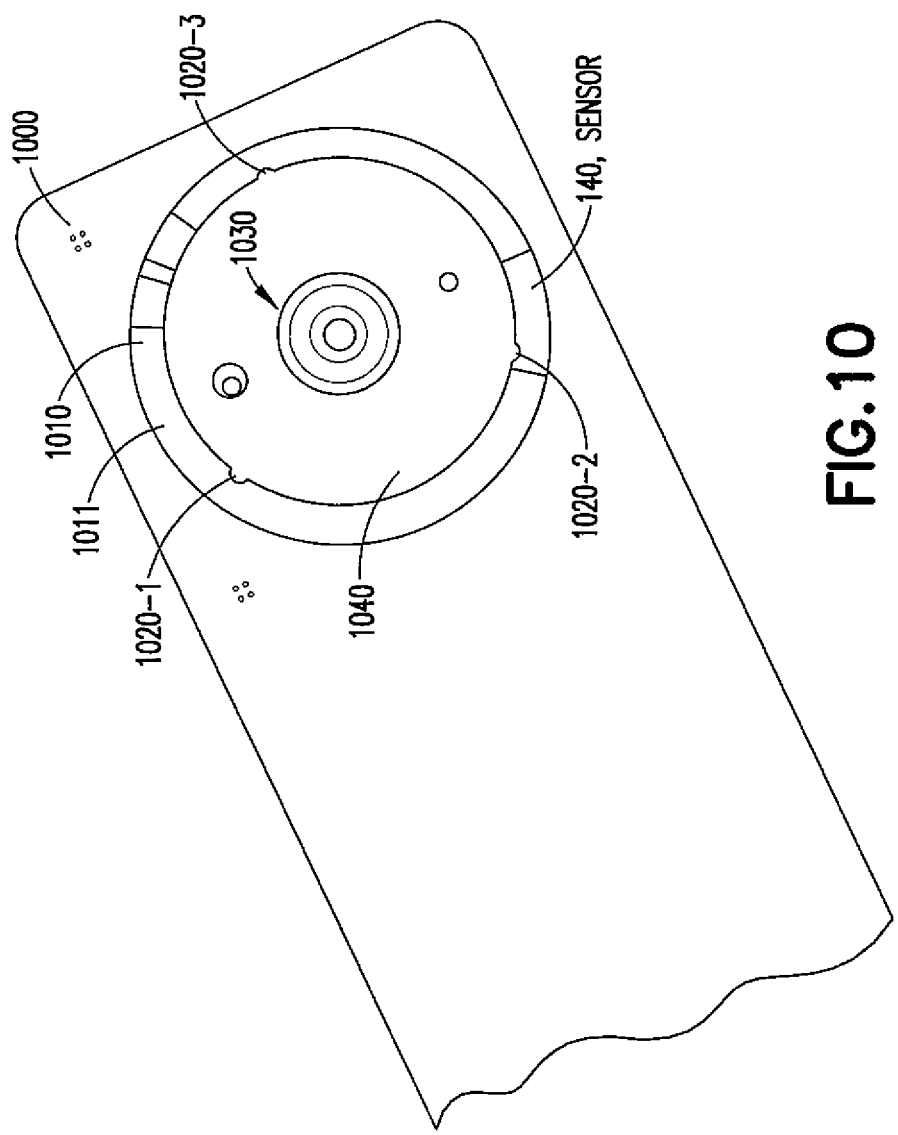

ACCESSORY IDENTIFICATION AND CONFIGURATION AND CORRESPONDING ACCESSORY

TECHNICAL FIELD

This invention relates generally to portable devices and, more specifically, to portable devices with interchangeable accessories.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Camera systems may have fixed or changeable optic lenses. In the case of changeable optical lenses, one possible technique for using changeable lenses and other accessories is that an accessory is not detected. This compromises tuning of the camera, as the camera is not optimized for the accessory. However, this is a low cost compromise.

For those systems where lens or other accessory identification is used, the lens identification is beneficial to optimize camera imaging processes. The most used method to identify a changeable optic lens or other accessory is through an electrical interface from the camera body to the lens unit. Using this electrical interface, the camera may read out an ID from an IC inside the accessory. This is a higher cost technique, as it requires the electrical interface and embedding of the IC inside the accessory.

Additionally, for portable devices such as mobile devices, there are limitations of metal usage due to possible disturbance to antenna systems. In these cases, only non-conductive materials may be used in detachable lenses and other accessories.

Furthermore, typically a surface of the accessory mates with a surface of the body of the device, generally through a bayonet mount. Even if one can determine what accessory is installed, for instance using an electrical interface, that determination is the extent of what can occur due to the fixed configuration of the surfaces of the accessory and the body.

SUMMARY

This section contains examples of possible implementations and is not meant to be limiting.

In an exemplary embodiment, an accessory includes a body comprising a dial having a surface The accessory includes a plurality of sets of optically-recognizable identification marks formed as part of the surface of the dial, wherein the identification marks for each set are formed to be recognizable by a sensor having a two dimensional array of pixels.

In another exemplary embodiment, an apparatus includes one or more processors and one or more memories including computer program code. The one or more memories and the computer program code are configured, with the one or more processors, to cause the apparatus to perform at least the following: capturing, with a sensor having a two dimensional array of pixels, an image of one of a set of plurality of optically-recognizable identification marks formed as part of a surface of a dial of an accessory; determining from the captured image a specific one of a plurality of possible accessories interchangeable for use with the apparatus; and performing one or more configuration operations based on the specific accessory.

In another exemplary embodiment, an apparatus includes a body comprising a groove having a first surface configured to align with a second surface of an accessory when a portion of the accessory is placed into the groove, and a sensor formed in the first surface, the sensor comprising a two dimensional array of pixels.

BRIEF DESCRIPTION OF THE DRAWINGS

In the attached Drawing Figures:

FIG. 5A illustrates another example of a single optical identification pattern formed in a perimeter area of the accessory mating surface of the accessory;

FIG. 5B illustrates a specific example of an optical identification pattern using the pattern in FIG. 5A;

FIG. 7, including

FIG. 8, including

FIG. 9, including

FIG. 10 is an example of a mobile phone having an exemplary accessory mating surface, a groove in this example;

DETAILED DESCRIPTION OF THE DRAWINGS

The exemplary solutions herein use optical identification to identify different lenses and other accessories. The exemplary embodiments therefore do not affect the antenna performance of a mobile, wireless device. Furthermore, the exemplary embodiments allow a low cost lens solution to be achieved, e.g., as no electrical components for certain exemplary embodiments need be embedded in an accessory. It is noted that the exemplary embodiments do not foreclose the use of embedded electrical components.

Figure 1:
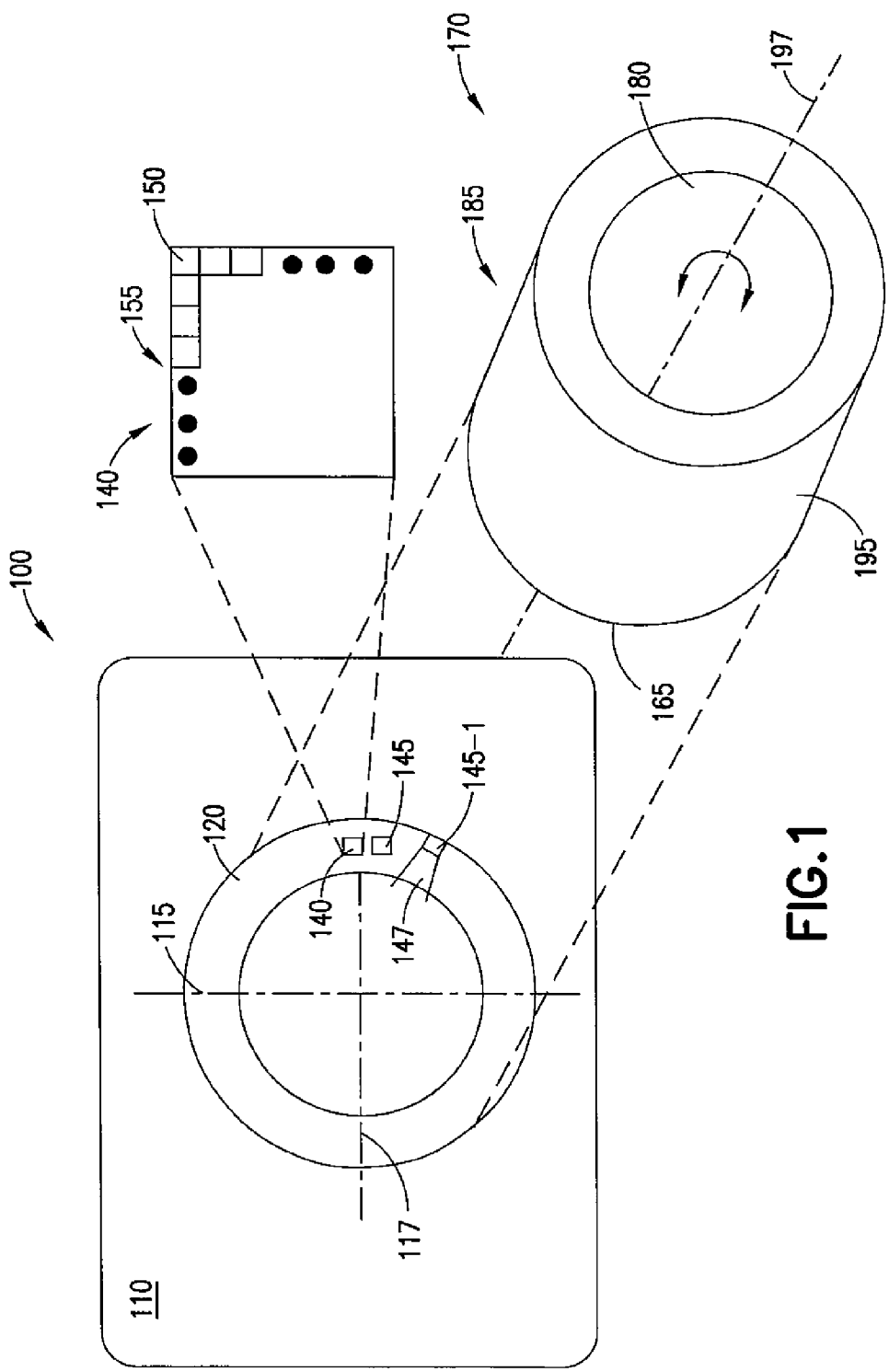
FIG. 1 illustrates a portable device in accordance with an exemplary embodiment.

Turning to FIG. 1, this figure illustrates a portable device in accordance with an exemplary embodiment. The portable device is a camera 100 (in this example) that has a body 110, which has an optical axis 197 and has an optical plane formed coextensive with axes 115 and 117 over which an optical accessory such as lens accessory 170 would be placed. The lens accessory 170 comprises a body 185 having an accessory mating surface 165 that mates with an accessory mating surface 120 on the body 110 of the camera 100. The lens accessory 170 includes a lens portion 180 that aligns at least in part with the optical plane coextensive with axes 115 and 117.

The body 110 of the camera 100 includes a matrix sensor 140 incorporated into the accessory mating surface 120. The matrix sensor 140 includes a two-dimensional array 155 of pixels 150. The matrix sensor 140 will enable the camera 100 to detect identification pattern(s) formed into or on the accessory mating surface 165 of the accessory 170. The body 185 may comprise a barrel 195 that, when rotated, also causes the accessory mating surface 165 to rotate relative to the accessory mating surface 120 and, e.g., around the optical axis 197 about which the body 185 (or a portion thereof) rotates.

FIG. 1 also shows a light source (e.g., an LED 145) incorporated into the accessory mating surface 120. The light source 145 is used in certain exemplary embodiments such as when the matrix sensor 140 is an RGB sensor. The light source 145 is used in these embodiments to illuminate a portion of the accessory mating surface 165 so the matrix sensor 140 can optically recognize the identification patterns and, e.g., color in the identification pattern(s). A system might therefore use a light source 145 to see surface details. The light source 145 may be placed in a number of different positions. For instance, the light source 145 might be placed to a side to see easily surface variations. An example of this is shown as light source 145-1 which is placed to a side relative to where an ID pattern would be positioned and the light beam 147 could therefore illuminate an area of the surface 165. The light source 145 can be IR, UV, or visible light depending on capabilities of the sensor 140. In case of UV and IR, the light source 145 might be hidden to the human eye during operation of the light source.

Figure 2:
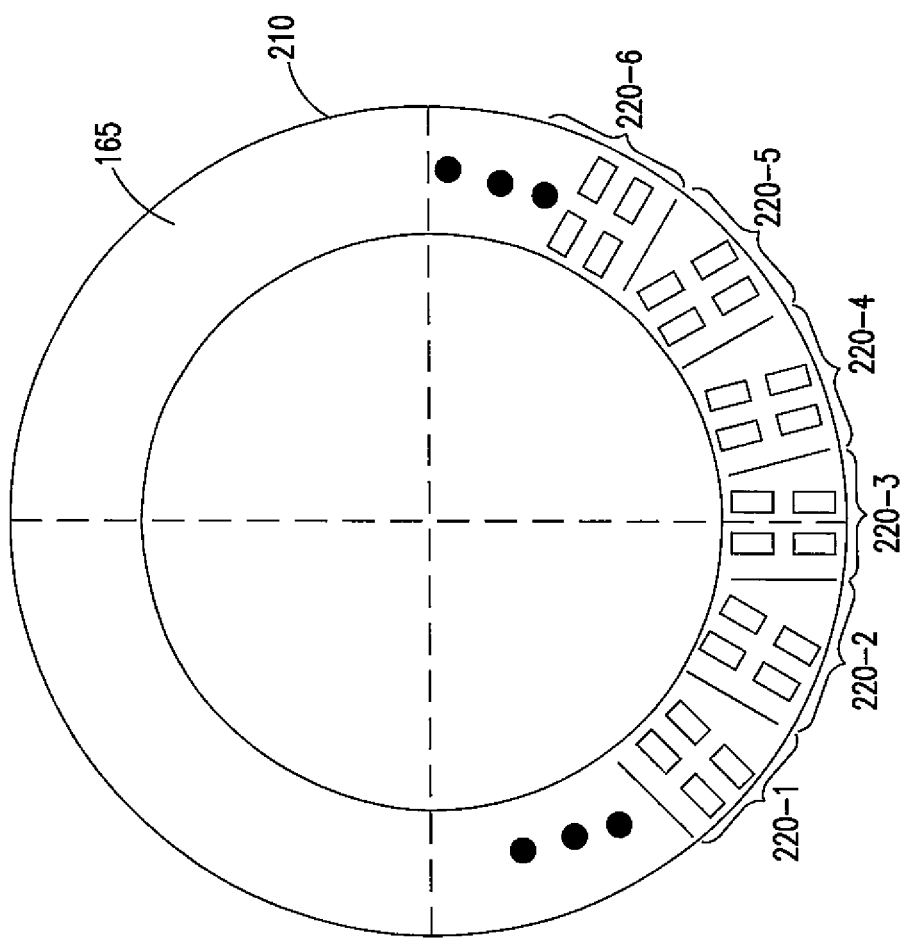
FIG. 2 illustrates an example of optical identification patterns formed in a perimeter area of the accessory mating surface of the accessory.

FIG. 2 illustrates an example of ID patterns 220 formed adjacent a perimeter 210 of the accessory mating surface 165 of the accessory 170. In this example and explained in additional detail below, the ID patterns 220 include a plurality of two-dimensional arrays of optically-recognizable identification marks and an additional optically-recognizable identification mark used as a synchronization feature (a line in this example).

Figure 3:
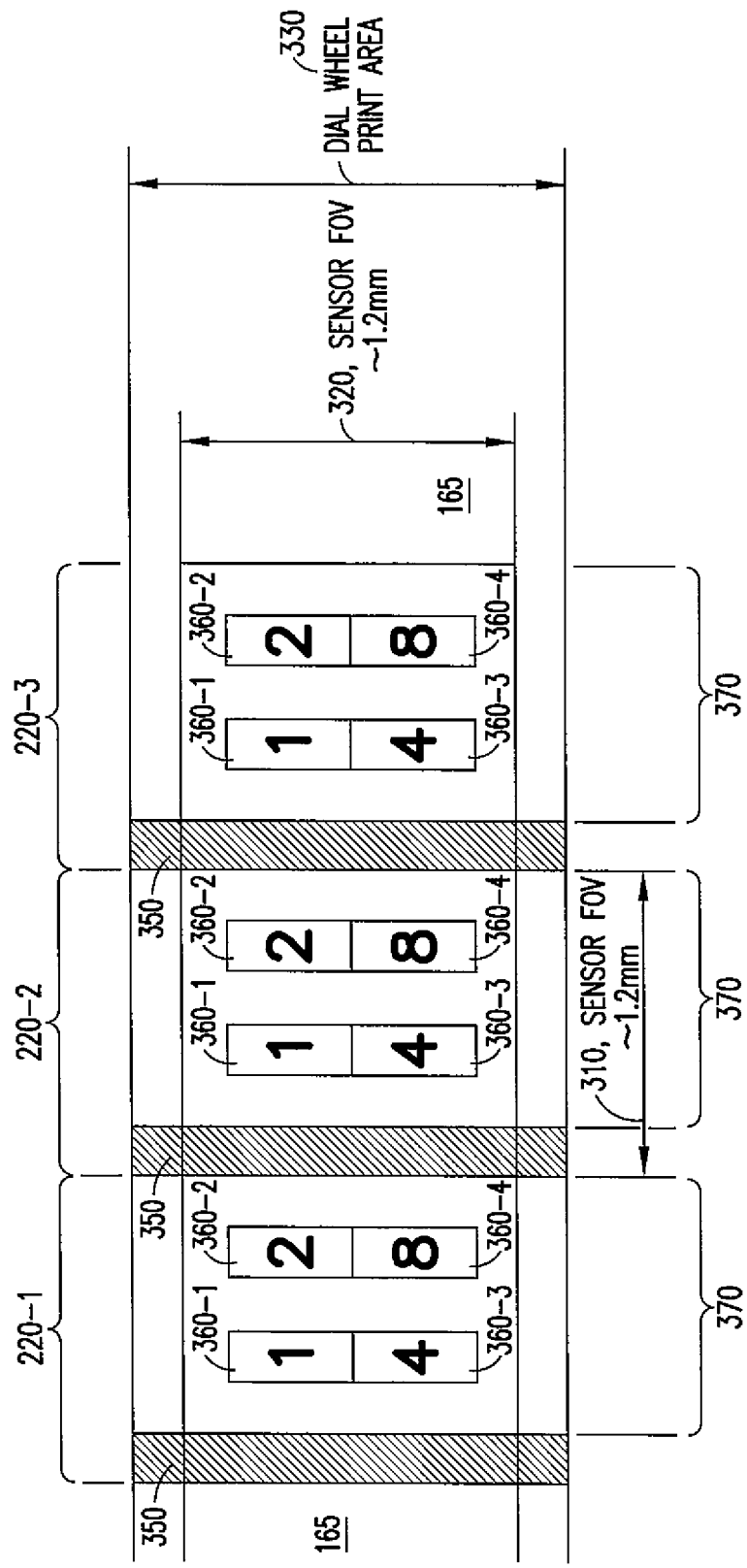
FIG. 3 illustrates another example of optical identification patterns formed in a perimeter area of the accessory mating surface of the accessory.

FIG. 3 provides another example of optical identification patterns formed in a perimeter area of the accessory mating surface of the accessory. The ID patterns 220 include an optically-recognizable identification mark 350 that is used as a synchronization feature, so that a portable device such as camera 100 can determine where the locations 360 and area 370 is. Area 370 is an area sized to hold at least a two-dimensional array of locations 360. Each location 360 is sized to hold a second optically-recognizable identification mark formed as part of the mating surface 165. A sensor FOV 320 in a vertical direction is shown, and this sensor FOV 320 is about 1.2 mm in this example. A dial wheel (e.g., as part of the barrel 195) print area 330 is also shown, and such print area 330 might be an outer area (adjacent the perimeter 210) of the mating surface 165. A dial wheel is in an exemplary embodiment a rotating portion of the accessory 170 and the dial wheel may or may not have an additional lens and may or may not have external markings (that is, markings on an outside of the barrel 195). A dial wheel may also be a fixed portion of the accessory 170. As accessories 170, there are other lenses that go on in place of the dial wheel. For example, an accessory zoom lens may be an option. The sensor FOV 310 in a horizontal direction is about 1.2 mm in this example. The optically-recognizable identification mark 350 and the area 370 are configured such that the area 370 is at a predetermined physical relationship to the optically-recognizable identification mark 350. The optically-recognizable identification mark 350 is like a "sync" (synchronization) line in this particular pattern. The sync line helps an algorithm used by a portable device to detect and locate the area 370 containing actual data bits in the locations 360. As the accessory 170 may be a fully 360-degree rotatable system, the sync line is helpful to detect actual data. This is related to this particular pattern and coding method.

In this example, the location 360-1 corresponds to a value of one, the location 360-2 corresponds to a value of two, the location 360-3 corresponds to a value of four, and the location 360-4 corresponds to a value of eight. The optically-recognizable identification marks in the locations 360-1 could be nothing (e.g., a flat surface), which might be interpreted as a zero, or a feature, which might be interpreted as a one.

Figure 4:
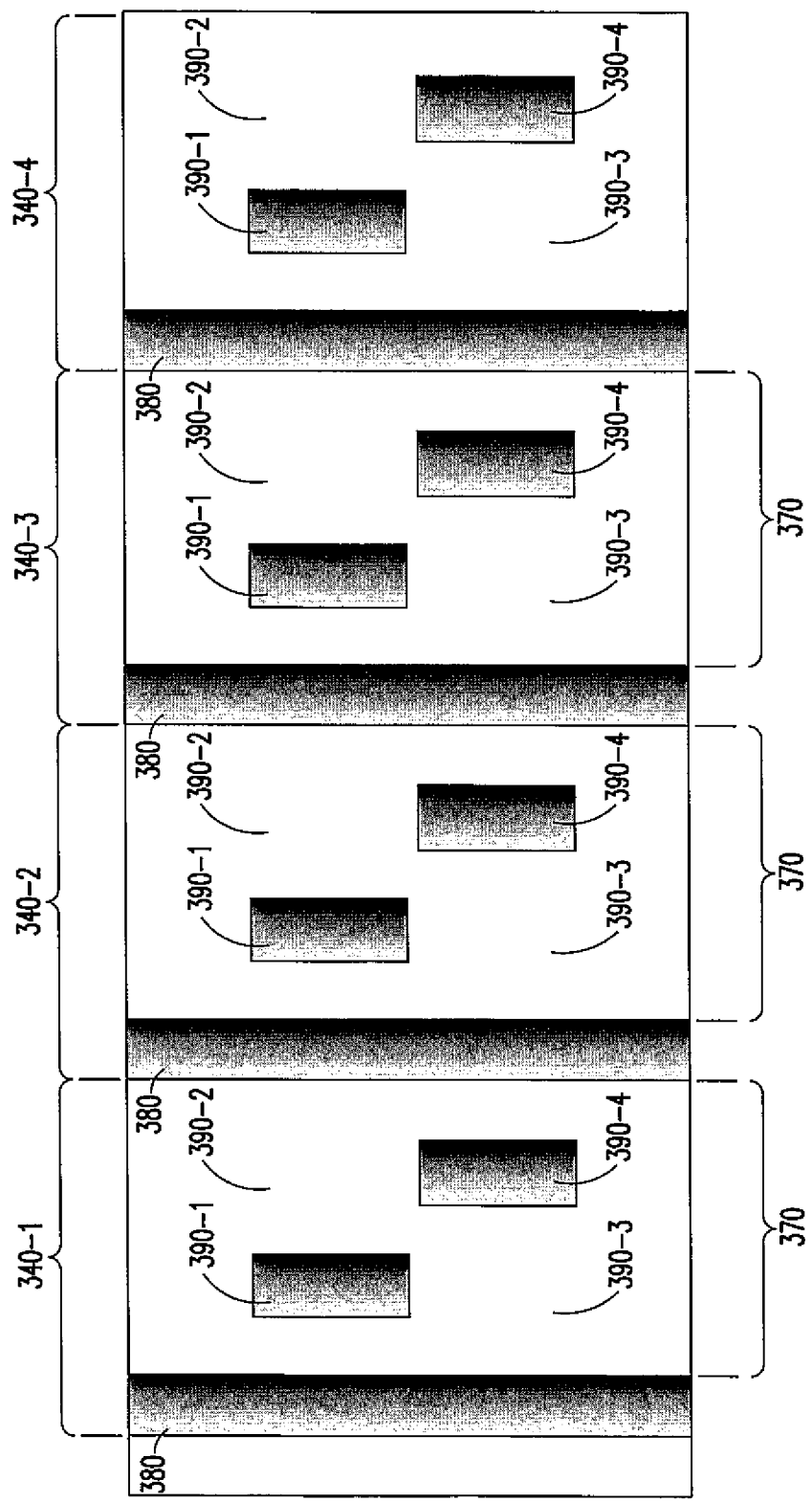
FIG. 4 illustrates a specific example of an optical identification pattern using the patterns in FIG. 3.

FIG. 4 illustrates a specific example of an optical identification pattern using the patterns in FIG. 3. The optically-recognizable identification marks 390 correspond to the locations 360. In this case, the optically-recognizable identification marks 390-1 and 390-4 have optically-recognizable features as a raised area, whereas the optically-recognizable identification marks 390-2 and 390-3 are simply flat areas (which are optically-recognizable as such or at least as not being raised areas). Based on the value assignment described above with respect to FIG. 3, the value associated with this accessory is nine, since the raised area for 390-1 corresponds to location 360-1, which corresponds to one, and the raised area for 390-4 corresponds to location 360-4, which corresponds to eight. It is noted that the raised area 380 corresponds to the optically-recognizable identification mark 350, and the raised area 380 may be used as a sync line and also used to determine the location of the corresponds area 370.

Turning to FIG. 5A, this figure illustrates another example of a single optical identification pattern formed in a perimeter area of the accessory mating surface of the accessory, while FIG. 5B illustrates a specific example of an optical identification pattern using the pattern in FIG. 5A. This example shows equal spacing (a), which is matched with the FOV of the sensor 140. The FOV estimate is ~1.2 mm. Therefore, a=1.2 mm/6=0.2 mm, and this is equal to the size of each space 510 (of which spaces 510-1, 510-2, and 510-3 are shown) and size of the locations 360 and the corresponding markings 390-1 and 390-4. In the vertical direction, the size of the locations 360 and the corresponding markings 390 are about 2 a (see FIG. 5B) or 0.4 mm and the spaces 520-1 and 520-1 are about a. Thus, the locations 360 and corresponding markings 390 (and spaces 510/520 and marking 350/380) are related to the FOV.

The identification patterns described above are merely exemplary. One may have just lines, an algorithm might count how many lines are seen, or there may even be different shapes to detect, or shape(s) and line(s) may be used together. This is very flexible, as an ID pattern is detected by capturing a "picture" of that ID pattern by using a miniature camera type of sensor 140.

The complexity of the ID pattern is related to how many different IDs are to be detected. If it is desired to detect just two different types, then one may use simple lines in the accessory 170, e.g., one line equals "type 1", two lines equals "type 2". This system could be very simple.

Figure 6:
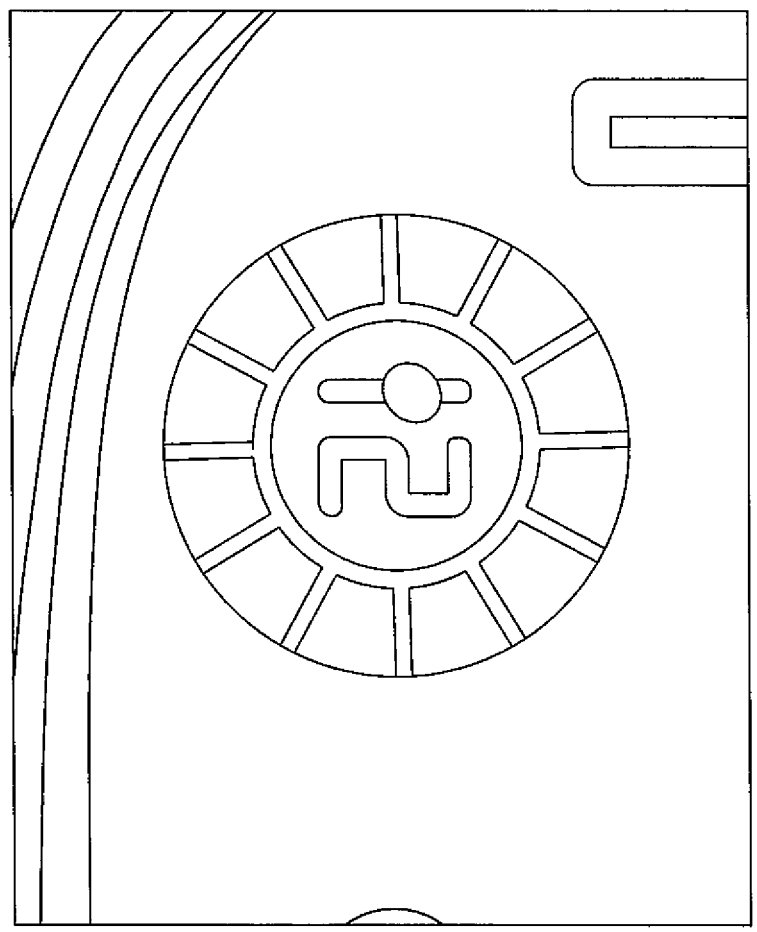
FIG. 6 illustrates another possible identification pattern.

However, if there are more ID patterns to detect, such as having 10 or more ID patterns to be detected, then some kind of data pattern and more complex system is needed. The ID pattern can be also be any shape. For example, circle="type 1", square="type 2" and the like. Furthermore, the ID pattern may be like a decorative pattern which has ID information inside. For example, see FIG. 6, which illustrates another possible identification pattern. In this case, the number "21" is located in a center circle surrounded by additional markings.

The ID pattern might be printed, e.g., by using a laser to change surface color, or might be created using surface flatness variation, e.g., meaning very small holes/lines/forms. As stated above, the system might use a light source 145 to see surface details. The light source (e.g., 145-1, see FIG. 1) can be placed to the side to easily see surface variations. The light source can be IR, UV, visible light (e.g., or some combination of these) depending on the sensor capabilities. In case of UV or IR, an ID pattern and subsequent reading might be hidden to the human eye. There should be at least enough contrast that the camera system can robustly detect the ID pattern being used and provide suitable data for algorithms.

Figure 7A:
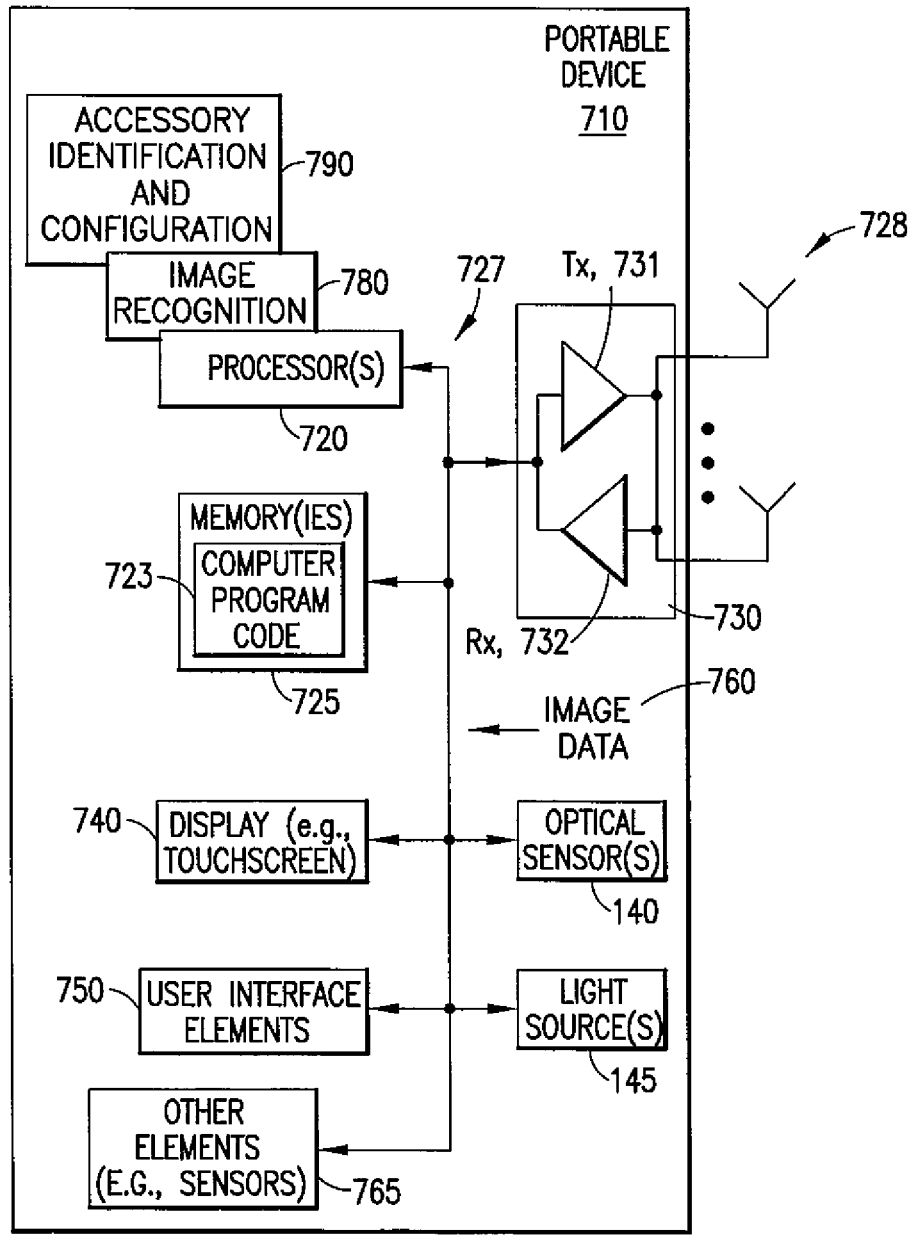
FIGS. 7A, 7B, and 7C, is an example of a portable device in accordance with an exemplary embodiment.
Figure 7B:
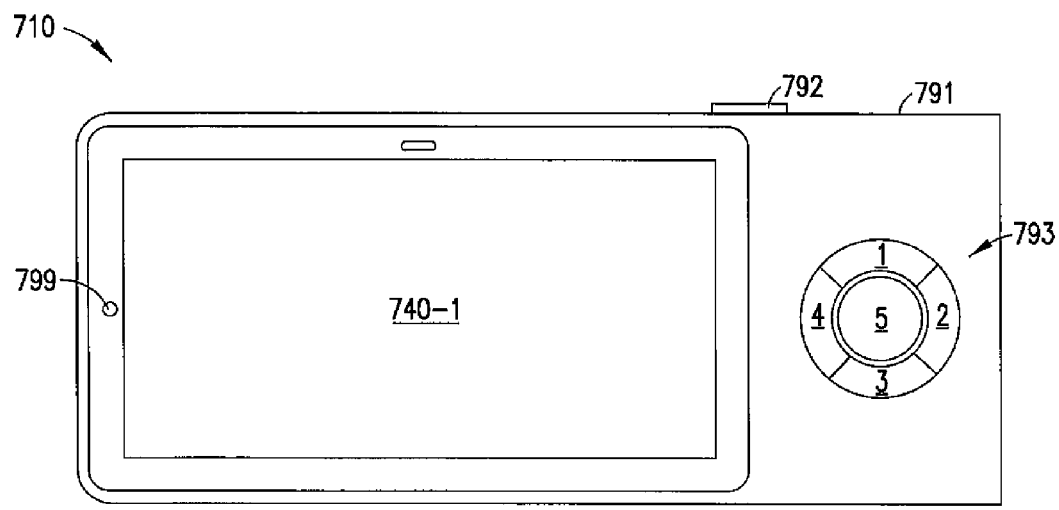
Figure 7C:
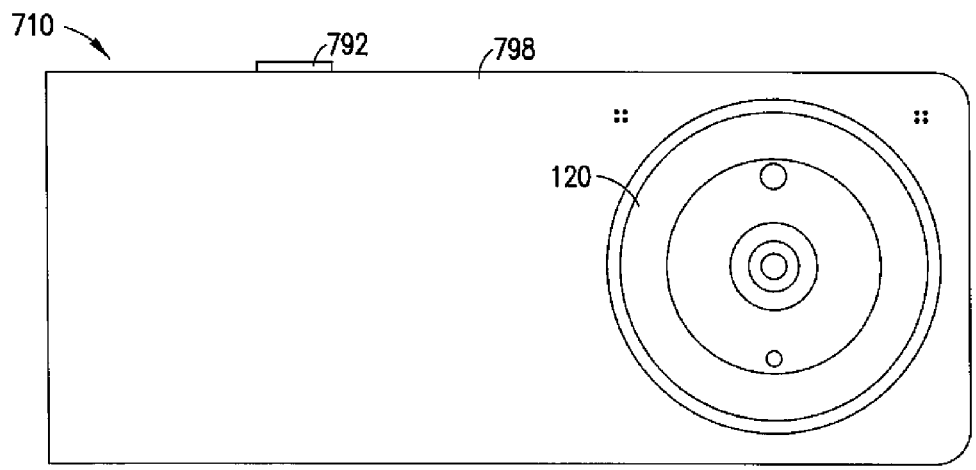

Referring to FIG. 7, including FIGS. 7A, 7B, and 7C, this figure is an example of a portable device in accordance with an exemplary embodiment. FIG. 7A illustrates possible internal electronic devices suitable for use with a portable device, and FIGS. 7B and 7C illustrate a back 791 and front 798, respectively, of the portable device 710. In FIG. 7A, the portable device 710 in this example includes one or more antennas 728 (multiple antennas are shown), one or more processors 720, one or more memories 725, and one or more transceivers 730, a display 740 (such as a touchscreen), user interface elements (such as buttons) 750 and other elements (such as sensors like light sensors, global positioning system sensors, or magnetic field, orientation, or proximity sensors), interconnected using one or more buses 727. The portable device 710 is typically a handheld device, but it is possible for non-handheld devices to be used with the exemplary embodiments. The one or more buses 727 may be any physical devices for interconnecting electronic elements, such as traces on a board, metal or other conductive runs on an integrated circuit, optic channels or elements, and the like. They may include data, memory, or control information. Each of the one or more transceivers 730 includes one or more transmitters (Tx) 731, one or more receivers (RX) 732, or both. The one or more memories include computer program code 723. The portable device 710 includes an accessory identification and configuration module 790 and an image recognition module 780. The modules 780 and 790 may be implemented in part as software, such that the one or more memories 725 and the computer program code 723 are configured to, with the one or more processors 720, cause the portable device 710 to perform one or more of the operations as described herein. The modules 780 and 790 may be implemented as hardware logic, such as in an integrated circuit, a gate array or other programmable device, discrete circuitry, and the like. The modules 780 or 790 could be implemented through some combination of computer program code 723 and hardware logic.

The portable device 710 includes one or more optical sensors 140 and optionally one or more light sources 145. The one or more optical sensors 140 produce image data 760, using the two-dimensional array 155 of pixels 150. The one or more light sources 145 may be used to illuminate an area where an ID pattern is assumed to be positioned. The image recognition module 780, in an exemplary embodiment, can process the image data 760 to determine an accessory based on the ID pattern captured in the image data 760.

The portable device also 710 includes in certain exemplary embodiments a display 740, which in FIG. 7B is a touchscreen 740-1. The portable device 710 may also include a number of user interface elements 750, which are illustrated as a shutter control 792 in FIGS. 7B and 7C and a set 793 of buttons used, e.g., for selection and having up 1, right 2, down 3, left 4, and selection 5 buttons. These are merely exemplary and many other types of buttons and interface elements may be used. The portable device 710 also includes other elements 765 which may include many different types of sensors and may additionally include user feedback elements (e.g., LED 799, which can indicate the portable device 710 has power for instance).

The computer readable memory 725 may be of any type suitable to the local technical environment and may be implemented using any suitable data storage technology, such as semiconductor based memory devices, flash memory, magnetic memory devices and systems, optical memory devices and systems, fixed memory and removable memory. The processor(s) 720 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

The portable device 710 (and 100) may be any device that may use interchangeable elements, such as lenses. For instance, the portable device 710 could be a camera, smartphone, tablet, and the like. In addition to lenses, the accessories 170 may be sliders, a jog dial, a thumb wheel, a spare button, and the like.

Figure 8A:
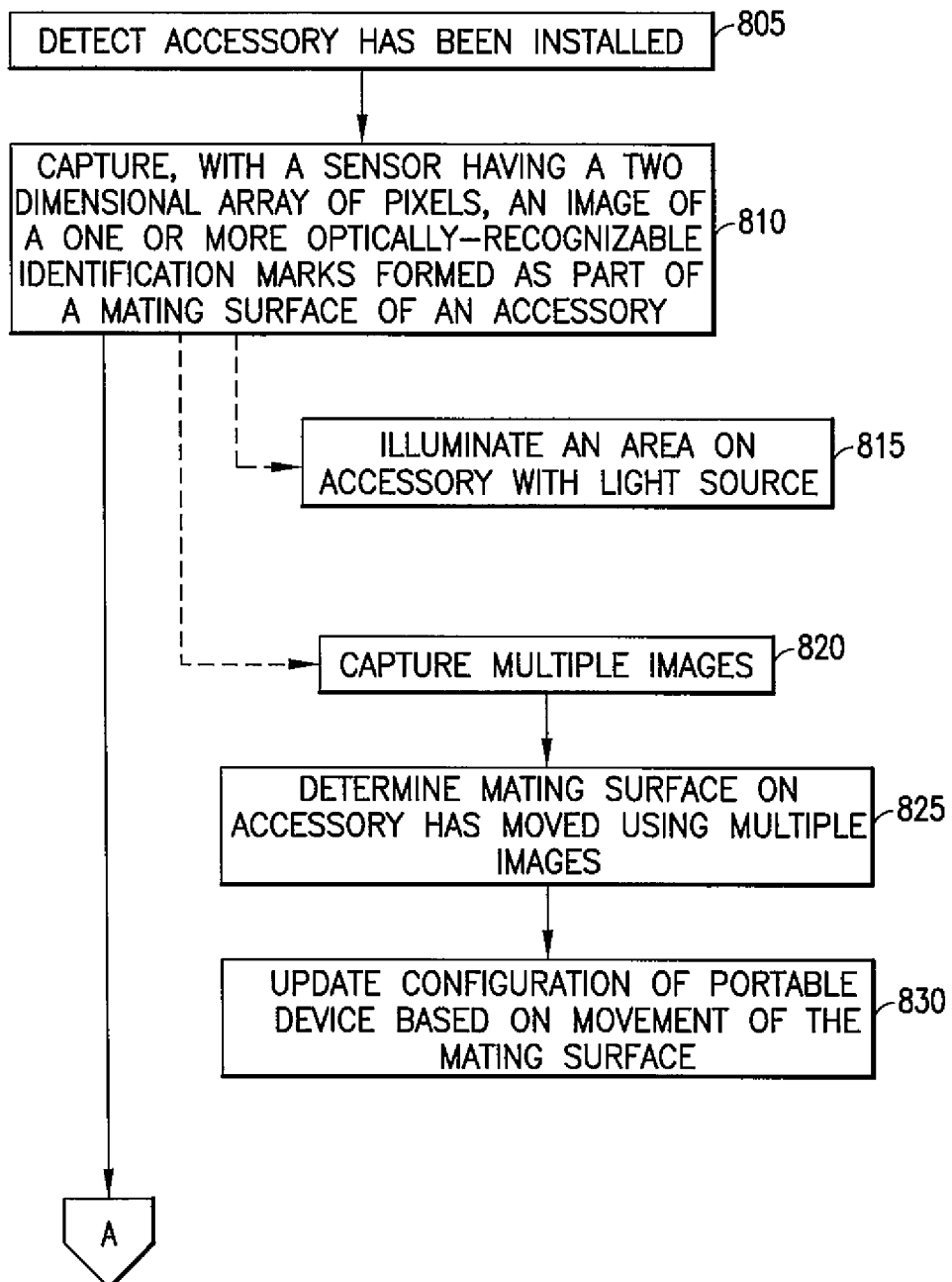
FIGS. 8A and 8B, is a block diagram of an exemplary logic flow diagram performed by a portable device for accessory identification and configuration that illustrates the operation of an exemplary method, a result of execution of computer program instructions embodied on a computer readable memory, and/or functions performed by logic implemented in hardware, in accordance with exemplary embodiments herein.
Figure 8B:
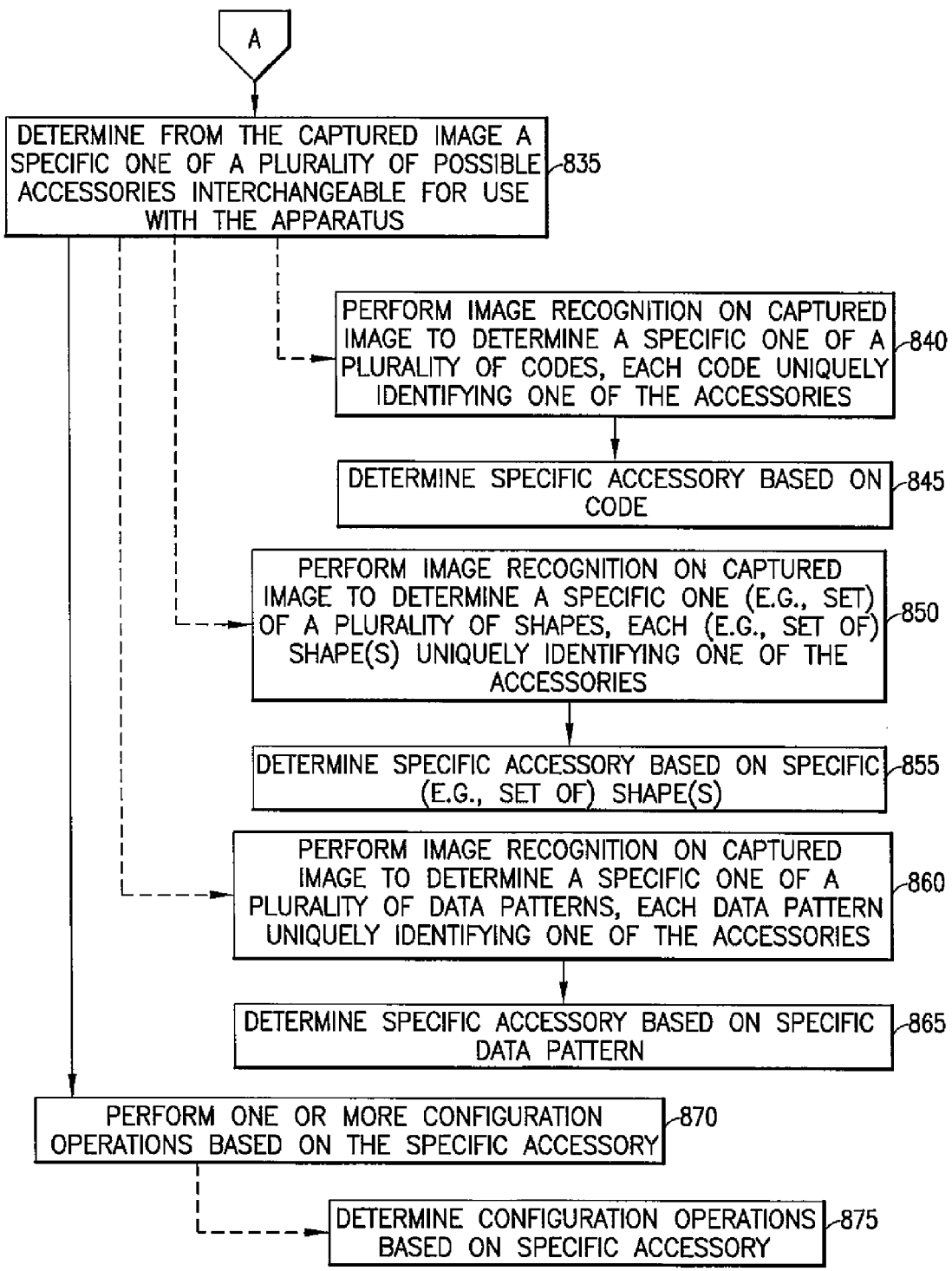

Referring to FIG. 8, which includes both FIGS. 8A and 8B, a block diagram is shown of an exemplary logic flow diagram performed by a portable device for accessory identification and configuration. FIG. 8 illustrates the operation of an exemplary method, a result of execution of computer program instructions embodied on a computer readable memory, and/or functions performed by logic implemented in hardware, in accordance with exemplary embodiments herein. The blocks in FIG. 8 may be considered to be interconnected means for performing the functions in the blocks. The blocks in FIG. 8 may be performed by a portable device 710, e.g., under control of at least the accessory identification and configuration module 790. Depending on implementation, the image recognition module 780 may also be used. For instance, in an exemplary embodiment, the accessory identification and configuration module 790 might cause the portable device 710 to perform all blocks in FIG. 8. In another exemplary embodiment, the accessory identification and configuration module 790 may cause the portable device 710 to perform all blocks other than blocks involving image recognition, and the image recognition module 780 causes the portable device 710 to perform the blocks for image recognition.

The portable device 710 in block 805 detects that an accessory has been installed. In an exemplary embodiment, the matrix sensor 140 is always capturing images and the portable device 710 can therefore determine any time an accessory 170 is mated to the accessory mating surface 120 and additionally if the accessory mating surface 165 is moved relative to the surface 120 of the body 110. In other embodiments, the matrix sensor 140 captures images periodically. Other embodiments are also possible.

In block 810, the portable device 710 captures, with a sensor 140 having a two dimensional array of pixels, an image of one or more optically-recognizable identification marks formed as part of a mating surface of an accessory. As part of the capture, the portable device 710 may illuminate (block 815) an area on the accessory (e.g., the surface 165) with a light source 145.

In addition or alternatively, a user may rotate the body 185 (e.g., a barrel 195), which causes the accessory mating surface 165 on the body 185 to rotate relative to the fixed sensor 145 and fixed accessory mating surface 120 of the portable device 710. In terms of the user causing the accessory mating surface 165 to rotate, the portable device 710 can determine the rotation occurs and can perform action(s) based thereon. Blocks 820, 825, and 830 form an example of this. In block 820, the portable device 710 captures multiple images using the sensor 140. In an exemplary embodiment, the matrix sensor 140 operates continuously and therefore the image recognition module 780 can determine the rotation of the body 185. Other options are possible, such as having the matrix sensor 140 operate continuously but having the image recognition module 780 operate periodically (e.g., on a block of images from the matrix sensor 140, or having both the matrix sensor 140 and the image recognition module 780 operate periodically. In block 825, the portable device 710 determines the mating surface 165 on an accessory has moved using the multiple images. For instance, if a synchronization feature is used, the rotation of the feature could be determined using standard video processing techniques. Similarly, rotation of any ID patterns (such as ID patterns 220) can be determined, e.g., by comparing a single pixel in each of two subsequent images and determining if a feature of an ID pattern is in one but not in the other. Other techniques may also be used. In block 830, the portable device 710 updates configuration of the portable device based on movement of the mating surface. One possible updating of configuration would be that a zoom function could be activated and acted upon as the user rotates the barrel 195 relative to the device. Other examples include focus and applying one or more filters. It is also possible to cycle though data overlays that appear in the UI (user interface) as an overlay on the image or video being captured (this is described in relation to FIG. 9 below). This could also be used as a way to cycle though menus in a UI just like a jog dial or click wheel.

In block 835, the portable device 710 determines from the captured image a specific one of a plurality of possible accessories 170 interchangeable for use with the apparatus. Examples of block 835 are illustrated by blocks 840/845, 850/855, and 860/865. In block 840, the portable device 710 performs image recognition on the captured image to determine a specific one of a plurality of codes. Each code uniquely identifies one of the accessories 170. In block 845, the portable device 710 determines the specific accessory based on the code. An example of a code is illustrated, e.g., in reference to FIGS. 5A and 5B, where codes zero through 15 may be determined.

In block 850, the portable device 710 performs image recognition on the captured image to determine a specific one of a plurality of shapes. Each shape uniquely identifies one of the accessories. For instance, a square could be interpreted as one accessory, while a triangle could be interpreted as a different unique accessory 170. Thus, in block 855, the portable device 710 determines a specific accessory based on the specific shape. Furthermore, it should be noted that a set of shapes might be used. For instance, two ovals might be associated with one accessory, while two squares might be associated with a second accessory. As another example, an oval and a triangle might be associated with one accessory, while a square and a trapezoid might be associated with a second accessory. A set may include one shape or multiple shapes.

In block 860, the portable device 710 performs image recognition on the captured image to determine a specific one of a plurality of data patterns. Each data pattern uniquely identifies one of the accessories. Illustratively, the data pattern may be a single line, two lines, three lines, and the like. The data pattern may be more complex, such as that shown in FIG. 6. In block 865, the portable device 710 determines a specific accessory based on the specific data pattern.

In block 870, the portable device 710 performs one or more configuration operations based on the specific accessory. As an example of a configuration operation, the device 100/710 might determine a specific "tuned" characteristic of the image sensor (for taking a picture) appropriate for an accessory based on the innate characteristics of that accessory. In the example of an accessory lens, for example if a wide angle lens is used in the device, the device 100/710 might correct lens optical parameters like radial distortion to provide a better image. More specifically, if an accessory 170 includes traditional optics to capture a wide-angle visual field (e.g., a fisheye lens) the image sensor can be configured to compensate for unavoidable optical distortions or vignetting by digitally manipulating the image while the image in the image processing pipeline. Another example might be that accessories are available in different colors and a device UI is changing color or different feature set in the UI. The accessory 170 may be also an "upgrade kit accessory" to unlock more feature(s) in the device 100 or 710. Or, if an accessory is designed to be used in situations where the device should not operate its radios (e.g., to save power, or in situations where one must not produce any radio frequency energy), the device 100/710 could configure the device to always turn its radios off in response to the accessory being installed. In block 875, the portable device 710 determines the configuration operations based on the specific accessory. For instance, there could be a table of accessories and corresponding configuration operations.

It should be noted that a single image is primarily used in FIG. 8. However, multiple images may be used.

Turning to FIG. 9, including FIGS. 9A, 9B, 9C, and 9D, these figures illustrate possible configurations of a portable device that might be updated based on rotation of a portion of an accessory (and the corresponding rotation of multiple optically-recognizable ID marks). In this example, a UI 910 that would be shown on the touchscreen 740-1 is shown.

Figure 9A:
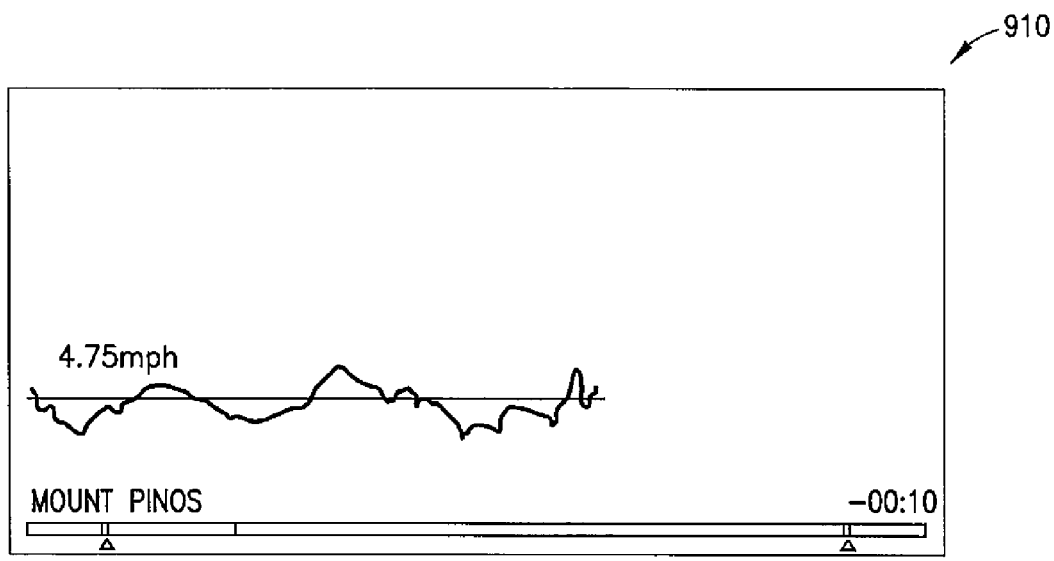
FIGS. 9A, 9B, 9C, and 9D, illustrate possible configurations of a portable device that might be updated based on rotation of a portion of an accessory (and the corresponding rotation of multiple optically-recognizable ID marks)
Figure 9B:
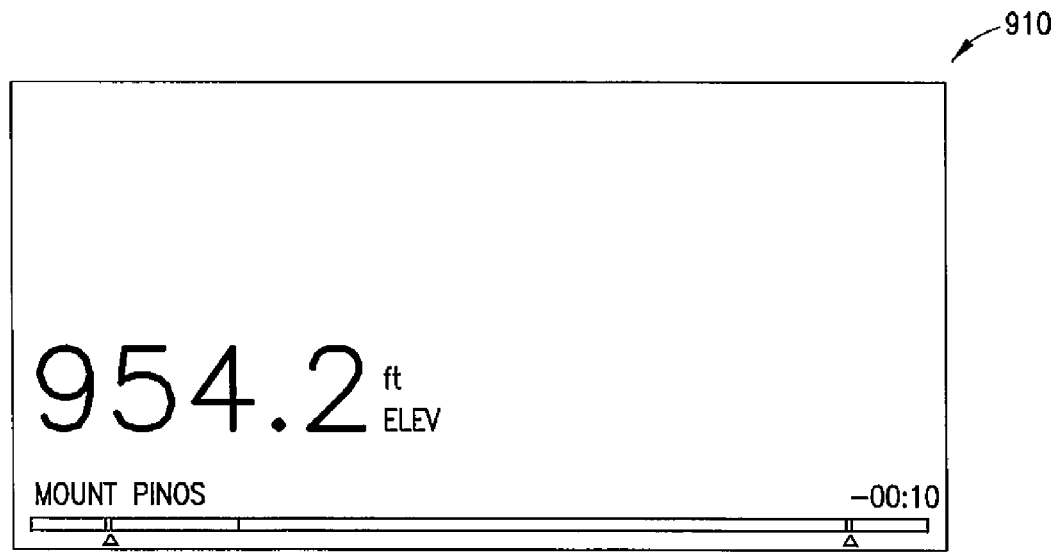
Figure 9C:
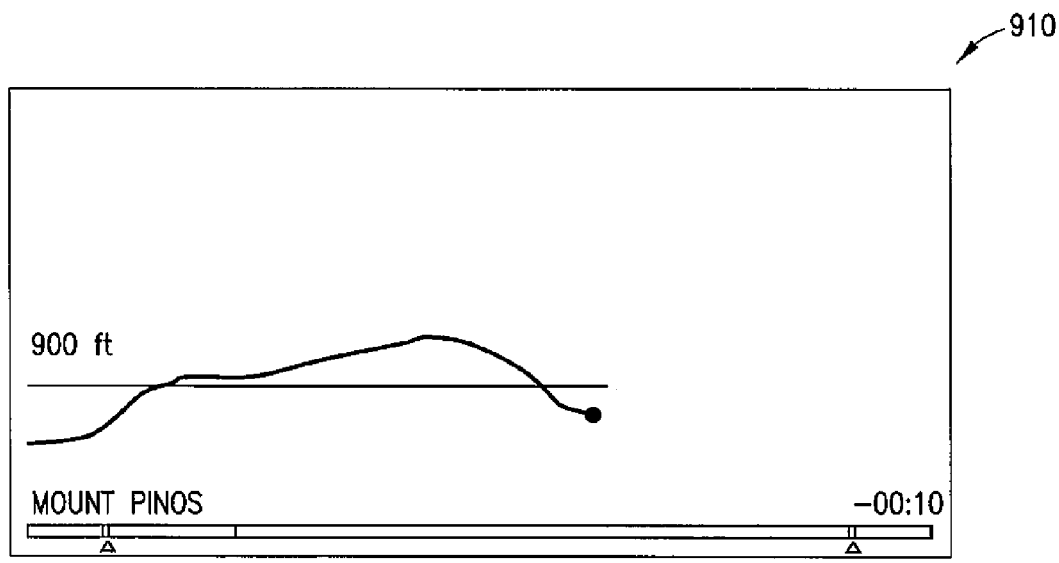
Figure 9D:
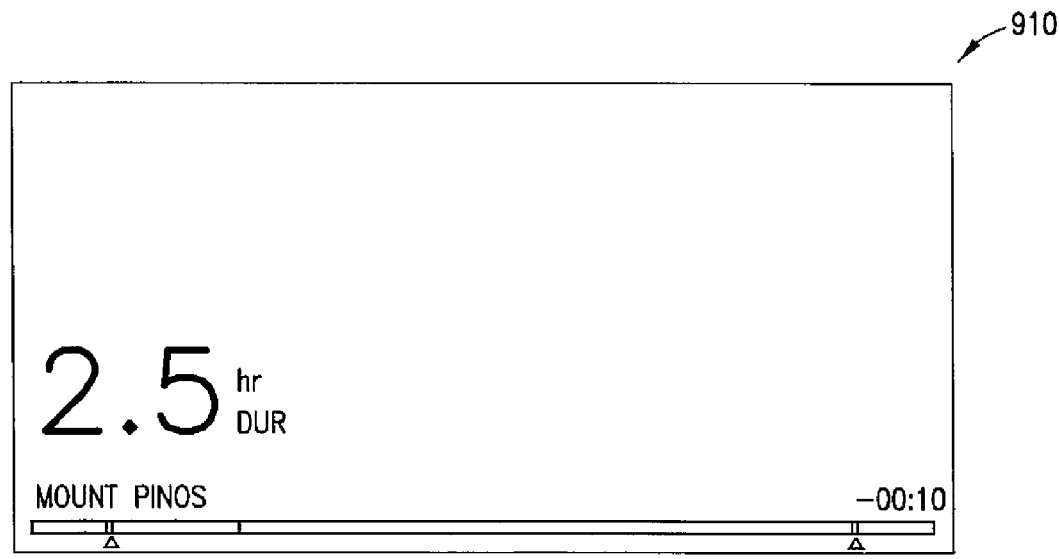

Each of the figures FIGS. 9A, 9B, 9C, and 9D illustrate an overlay that is selected by rotating a barrel 195 and therefore rotating multiple optically-recognizable ID marks on the accessory mating surface 165 of the accessory 170. FIG. 9A illustrates an overlay of a speed graph and an average speed of 4.75 mph (miles per hour) for a person skiing "Mount Pinos". By rotating the barrel 195 in a particular way (e.g., clockwise), the user can select the overlay of elevation, which is shown as 954.2 ft (feet) in FIG. 9B. Continuing to rotate the barrel 195 in the particular way causes the portable device 100/710 to show an overlay of an elevation graph, where the current elevation is 900 ft (see FIG. 9C). Similarly, continuing to rotate the barrel 195 in the particular way causes the portable device 100/710 to show a duration (DUR) of 2.5 hr (hours) in FIG. 9D. Similar techniques might be used to allow a user to select other interface elements (e.g., from a menu, pictures or videos in a set of files, and the like).

Turning to FIGS. 10, 11A, 11B, and 12, FIG. 10 is an example of a mobile phone 1000 having an example of an accessory mating surface. In this example, the accessory mating surface is a groove 1010 having a surface 1011. The mobile phone has an internal camera lens system 1030. The mobile phone 1000 also has a surface 1040 over which an accessory 170 would be placed. Three balls 1020-1, 1020-2, and 1020-3 are shown and these are used to retain an accessory as described below. It is noted that the surface 1011 and groove 1010 are configured to align with at least a surface of a dial 1100 (see FIG. 11A) as described below.

Figure 11A:
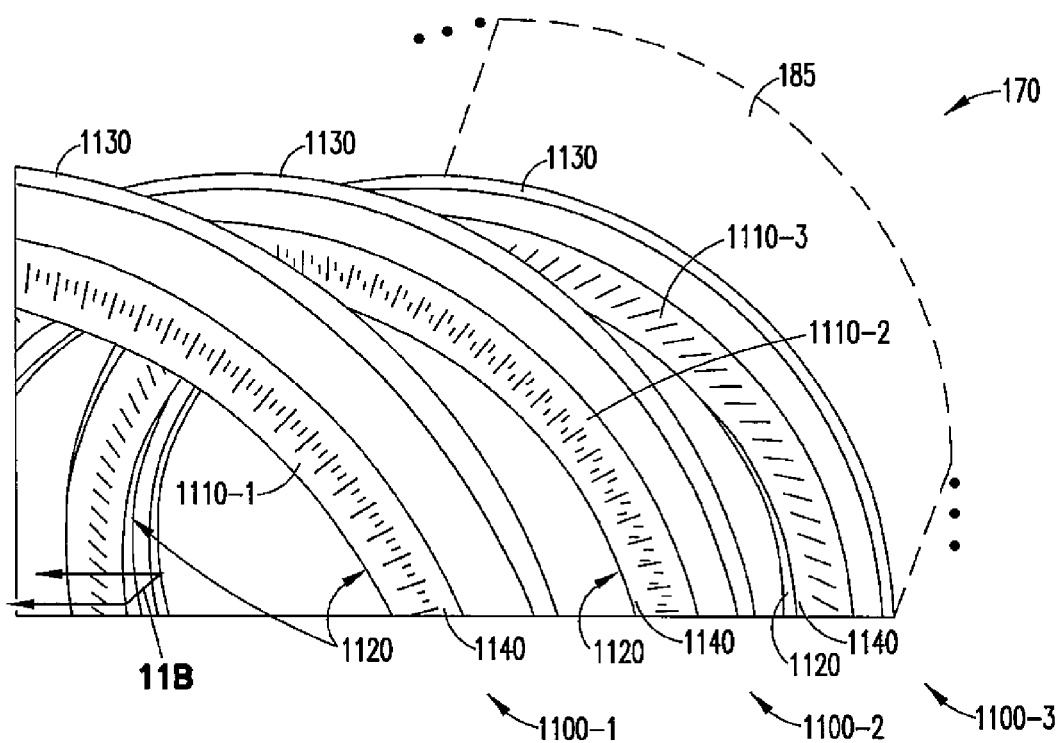
FIG. 11A shows an example of three dials that could fit into the groove in FIG. 10 and also illustrates different identification patterns.
Figure 11B:
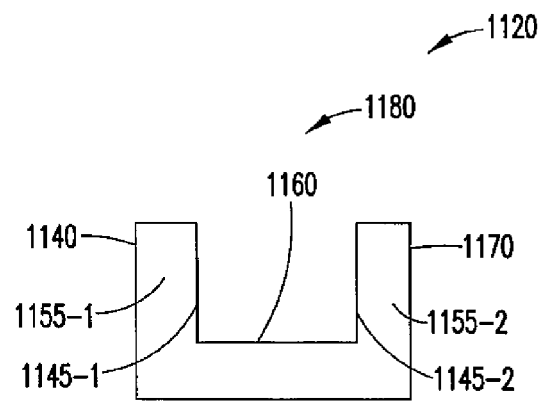
FIG. 11B is a cross section of a dial in FIG. 11A.

In FIG. 11A, this figure shows an example of three dials 1100-1, 1100-2, and 1100-3 that could align with and fit into the groove 1010 in FIG. 10 and also illustrates different identification patterns 1110. The dials 1100 may be used on any accessory 170. Dials 1100-1 and 1100-2 have identification patterns 1110-1 and 1110-2 that are identification patterns from FIGS. 3, 4, 5A, and 5B and are repeated on a lower side 1140 of the dial 1100. That is, the identification patterns are identical and are repeated multiple times. The identification pattern 1110-3 for dial 1100-3 has only a single line in a repeated pattern. Each ring 1100 has an outer periphery 1130 and an inner periphery 1120. The outer periphery 1130 is corrugated in this example, but could also be smooth or knurled. Integral with the inner periphery 1120 (see FIG. 11B, which is a cross section of a dial in FIG. 11A) is a race 1180 that includes inner surfaces 1145-1 and 1145-2 and a surface 1160, each of which may mate with a ball 1020 when the ring 1100 is placed at least in part in the groove 1010 in FIG. 10. The inner periphery includes rims 1155-1 and 1155-2. Rim 1155-1 has the lower side 1140 and the inner surface 1145-1, and rim 1155-2 has an upper side 1170 and an inner side 1145-2.

In the example of FIG. 11A, the accessory 170 is shown via dashed lines, as is the body of the accessory 170. That it, the accessory 170 is shown going "into" the page in this example. The outer side 1170 would couple the rest of the accessory 170 with the dial 1100.

Figure 12:
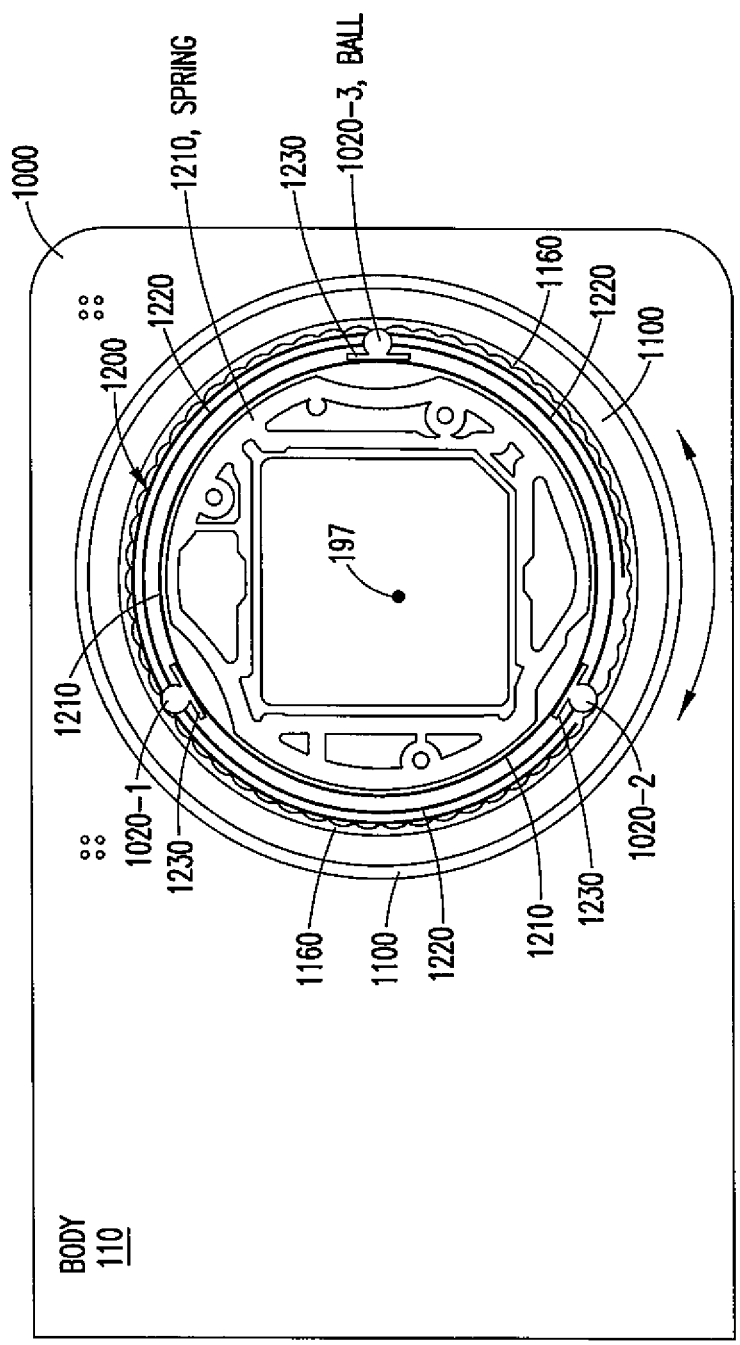
FIG. 12 is an illustration of the mobile phone and is used to illustrate a dial in FIG. 11A that is placed into the groove shown in FIG. 10.

FIG. 12 is an illustration of the mobile phone 1000 and is used to illustrate a dial 1100 in FIG. 11A that is placed into the groove shown in FIG. 10. A spring ball retention system 1200 is also illustrated in FIG. 12, and the spring ball retention system 1200 comprises a ring 1220 through which balls 1020 project. Each ball 1020 is connected to the spring 1210 via a corresponding one of the holding elements 1230-1, 1230-2, or 1230-3. A user pushes the accessory 170 and specifically the rim 1155-1 past the balls 1020 in order to connect the accessory 170 to the mobile phone 1000. During this process, each ball 1020 compresses the spring 1210 until the rim 1155-1 is past the balls, when the balls 1020 settle between the rims 1155-1 and 1155-2 and the spring 1210 at least partially decompresses from its most compressed point. It can be seen that the inner surface 1160 of the race 1180 has a corrugated surface in this example where each corrugation mates with a surface of a ball 1020. A user can move the dial 1100 clockwise or counter clockwise relative to the axis 197 (see FIG. 1 too). Movement of the dial 1100 can be detected because the patterns 1110 also move relative to a surface 1011 on the body 110. It is noted that the surface 1140 of the dial 1100 may or may not contact the surface 1011 at any point, as a distance from a center point of the balls 1020 and the size of the rim 1155-1 may be defined so that the surfaces 1140, 1011 touch or do not touch.

The exemplary embodiments have one or more of the following non-limiting advantages:

This is low cost solution compared to a system in which only an electrical interface is used;

This works with above water or under water, and there is no need to shield the identification interface (e.g., as compared to an electrical interface with exposed electrical surfaces, which would need to be shielded in a water environment);

If a system has restrictions of metal usage due to antenna performance, plastic accessories with identification markings can still be identified;

A system can easily detect a few tens of different accessory types depending optical sensor performance and identification coding method; and/or Identification marking can be a very tiny size, e.g., down to 1 mm×1 mm size, and in an optical sense, the marking may be almost invisible to a human eye.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 7. A computer-readable medium may comprise a computer-readable storage medium (e.g., memory(ies) 125 or other device) that may be any media or means that can contain or store the instructions for use by or in connection with an instruction execution system, apparatus, or device, such as a computer. A computer readable storage medium does not, however, encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

FOV field of view
IC integrated circuit
ID identification

IR infrared
LED light emitting diode
mm millimeters
RGB red green blue
UV ultraviolet

What is claimed is:

1. An accessory, comprising:
a body comprising a dial having a surface; and
a plurality of sets of optically-recognizable identification marks formed as part of the surface of the dial, wherein the identification marks for each set are formed to be recognizable by a sensor having a two dimensional array of pixels, and wherein each set of the one or more optically-recognizable identification marks comprises:
 a first optically-recognizable identification mark formed as part of the surface and used as a synchronization feature; and
 an area sized to hold at least a two-dimensional array of locations, each location sized to hold a second optically-recognizable identification mark formed as part of the surface, where the area is formed at a predetermined location relative to the first optically-recognizable identification mark.

2. The accessory of claim 1, where a physical configuration of the locations and the first optically-recognizable identification mark are based on a field of view of a sensor expected to be used to view the area and view the first optically-recognizable identification mark.

3. The accessory of claim 2, where widths of the locations and a width of the optically-recognizable identification mark are related to a fraction of the field of view of the sensor.

4. The accessory of claim 3, wherein a first two of the locations are in a first row having a first width, a second two of the locations are in a second row having a second width, and the first optically-recognizable identification mark has a third width, wherein the first, second, and third width are a predetermined width, wherein a first space separates the first optically-recognizable identification mark and the first row and a second space separates the first and second rows, wherein each of the first and second spaces has a width equal to the predetermined width, and wherein the predetermined width is based on the fraction of the field of view of the sensor.

5. The accessory of claim 1, wherein each set of the one or more optically-recognizable identification marks comprises a shape, one or more lines, or both a shape and one or more lines.

6. An apparatus, comprising:
one or more processors; and
one or more memories including computer program code, the one or more memories and the computer program code configured, with the one or more processors, to cause the apparatus to perform at least the following:
 capturing, with a sensor having a two dimensional array of pixels, an image of one of a set of a plurality of optically-recognizable identification marks formed as part of a surface of a dial of an accessory, wherein each set of the one or more optically-recognizable identification marks comprises:
  a first optically-recognizable identification mark formed as part of the surface and used as a synchronization feature; and
  an area sized to hold at least a two-dimensional array of locations, each location sized to hold a second optically-recognizable identification mark formed as part of the surface, where the area is formed at a predetermined location relative to the first optically-recognizable identification mark;
 determining from the captured image a specific one of a plurality of possible accessories interchangeable for use with the apparatus; and
 performing one or more configuration operations based on the specific accessory.

7. The apparatus of claim 6, wherein capturing further comprises:
causing the plurality of optically-recognizable identification marks to be illuminated with a light source.

8. The apparatus of claim 6, wherein capturing further comprises:
capturing multiple images using the sensor;
determining the surface on the accessory has moved using the multiple images; and updating configuration of the apparatus based on movement of the surface.

9. The apparatus of claim 6, wherein capturing further comprises:
performing image recognition on the captured image to determine a specific one of a plurality of codes, each code uniquely identifying one of the possible accessories; and
determining the specific accessory based on the code.

10. The apparatus of claim 6, wherein capturing further comprises:
performing image recognition on the captured image to determine a specific set of a plurality of sets of one or more shapes, each set uniquely identifying one of the possible accessories; and
determining specific accessory based on the specific set of one or more shapes.

11. The apparatus of claim 6, wherein capturing further comprises:
performing image recognition on the captured image to determine a specific one of a plurality of data patterns, each data pattern uniquely identifying one of the possible accessories; and
determining a specific accessory based on the specific data pattern.

12. The apparatus of claim 6, wherein the apparatus comprises a body comprising a first surface configured to align at least in part with the surface of the accessory, and wherein the sensor is formed in the first surface.

13. The apparatus of claim 6, wherein the apparatus is a handheld device.

14. An apparatus, comprising:
a body comprising a groove having a first surface configured to align with a second surface of an accessory when a portion of the accessory is placed into the groove;
a sensor formed in the first surface, the sensor comprising a two dimensional array of pixels; and
an accessory comprising:
 a second body comprising a dial having the second surface; and
 a plurality of sets of optically-recognizable identification marks formed as part of the second surface of the dial, wherein the identification marks for each set are formed to be recognizable by the sensor and wherein each set of the one or more optically-recognizable identification marks comprises:
  a first optically-recognizable identification mark formed as part of the surface and used as a synchronization feature; and
  an area sized to hold at least a two-dimensional array of locations, each location sized to hold a second optically-recognizable identification mark formed as part of the surface, where the area is formed at a predetermined location relative to the first optically-recognizable identification mark.

15. The apparatus of claim 14, wherein the body is configured to allow rotational movement of the accessory relative to the body.

16. The apparatus of claim 15, wherein the apparatus is configured to change a configuration of the apparatus dependent upon the rotational movement of the accessory.

17. The apparatus of claim 14, further comprising a light source formed in the first surface, the light source positioned to illuminate an area of the second surface when the first and second surface are aligned at least in part.

18. The apparatus of claim 14, wherein the light source comprises one or more of infrared, ultraviolet, or visible light.

* * * * *